Sept. 13, 1966                 O. STIEBER                 3,272,025
INFINITELY VARIABLE SPEED POWER TRANSMISSION, ESPECIALLY
BALL FRICTION TRANSMISSION
Filed May 20, 1964                                  2 Sheets-Sheet 1
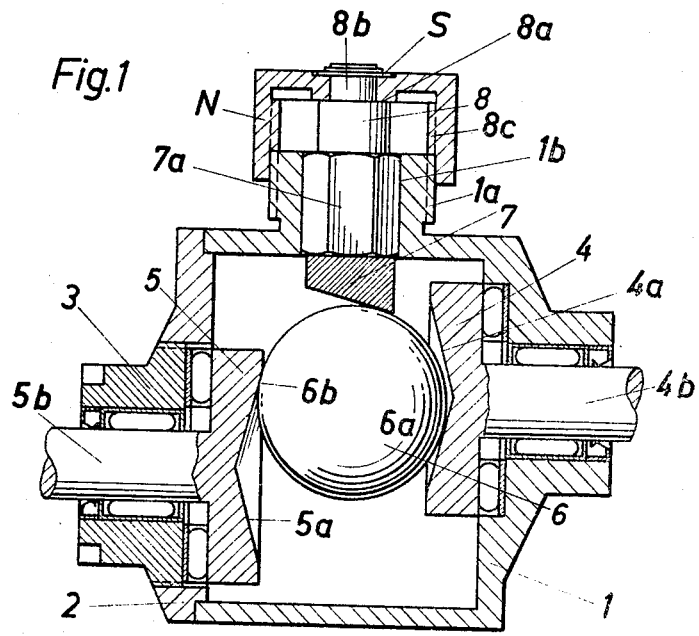
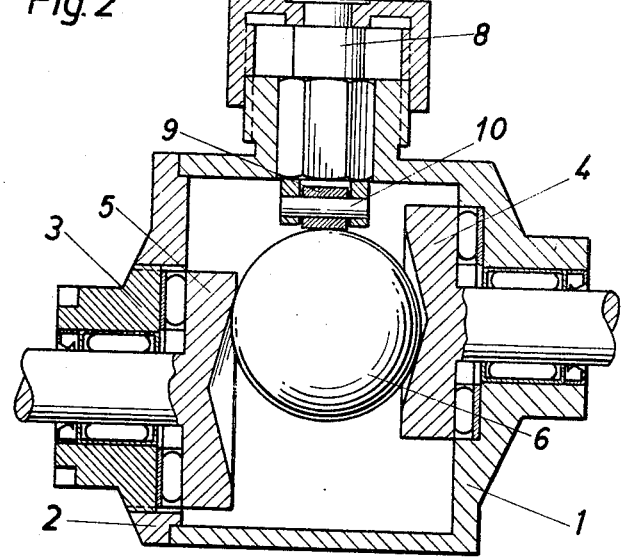
INVENTOR:
Ortwin Stieber
By Walter Becky Sept. 13, 1966 O. STIEBER 3,272,025
INFINITELY VARIABLE SPEED POWER TRANSMISSION, ESPECIALLY
BALL FRICTION TRANSMISSION
Filed May 20, 1964 2 Sheets-Sheet 2
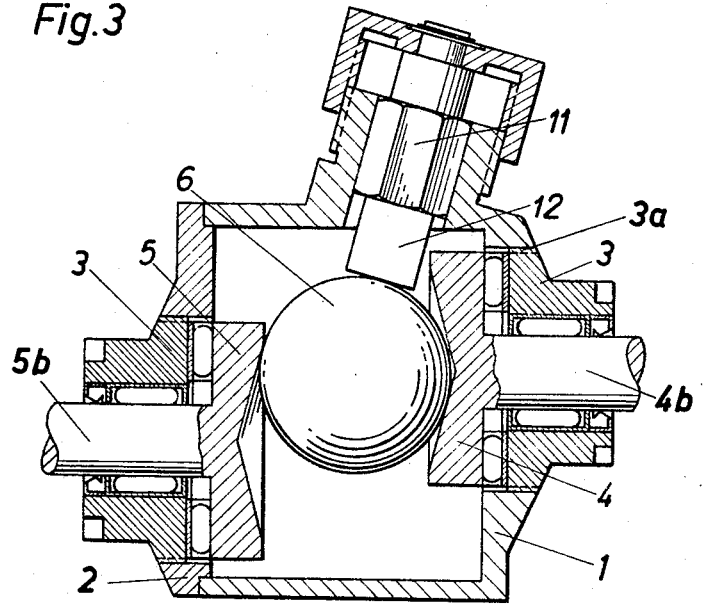
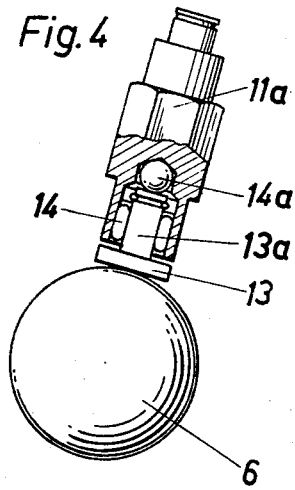 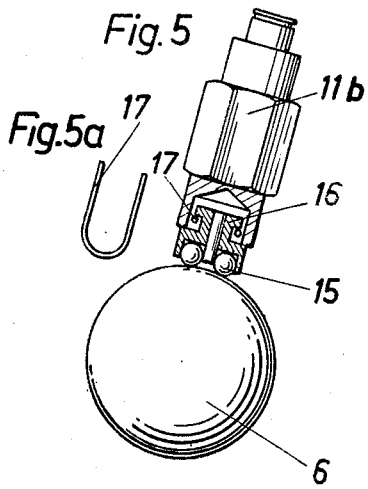
INVENTOR:
Orthwin Stieber
By

United States Patent Office 3,272,025
Patented Sept. 13, 1966

3,272,025
INFINITELY VARIABLE SPEED POWER TRANS-
MISSION, ESPECIALLY BALL FRICTION TRANS-
MISSION
Ortwin Stieber, Moosacherstrasse 51, Munich, Germany
Filed May 20, 1964, Ser. No. 368,946
18 Claims. (Cl. 74—198)

The present invention relates to an infinitely variable speed power transmission and, more specifically, to an infinitely variable ball friction transmission, in which the power transmission between the input and output shaft is effected by one ball only which is displaceable between two conical surface discs at the end of said two shafts and is clamped therebetween by a pressure force the magnitude of which is variable in conformity with the torque derived therefrom.

With heretofore known ball friction transmissions, the displacement of the ball, and thus the change in the transmission ratio, is effected by a control plate or a cage. These guiding elements for the ball are arranged between the conical surface discs, and the ball is embraced on all sides by said guiding elements. By displacing the guiding elements in a direction perpendicular to the longitudinal extension of said shafts, the location of the ball between said conical surface discs is varied and thereby the transmission ratio of said transmission.

In an effort to reduce friction wear of the guiding elements embracing the ball, it has been suggested, between control plate and transmission ball, to provide a ball bearing which has its outer ring located in the control plate and has its inner ring embracing the transmission ball in a cage-like manner.

The employment of a ball bearing, however, causes certain structural difficulties. The radial displacement of the guiding elements results in a displacement of the ball in axial direction. The ball must, therefore, in the inner ring of the ball bearing, be embraced with corresponding loose tolerance only so that the firm ball bearing fit customary for the inner ring, must not be employed. This brings about the drawback that the ball bearing inner ring is not turned by the fit of the balls in the inner ring but by a frictional force which is dependent on the control pressure for displacement of the balls. At low control pressure, when no speed change is being effected, the frictional force between transmission ball and ball bearing inner ring is very slight, so that a grinding between both parts and relative to each other will prematurely occur, with the drawbacks inherent thereto. Even when employing a laterally displaceable roller bearing for holding the ball in the control plate, it is not possible to arrange the ball with close fit in the inner ring of the bearing. This is due to the fact that in such circumstances, the ball would no longer be able to move freely toward all sides, so that the power would always be transmitted to the same circular area of the ball. Moreover, it should be borne in mind that during the displacement of the ball, the pole axis thereof always oscillates somewhat. If, however, ball is prevented from this oscillation, an increase in the wear between ball and conical surface disc will occur.

All heretofore known guiding elements embracing the ball not only have the disadvantage of a prematurely high wear but also require a considerable number of structural elements. When exchanging said guiding elements, it is necessary to dismantle the transmission because the guiding elements embrace the ball, which cannot be removed from between the conical surfaces. Consequently, ball friction transmissions of the said mentioned type have not been adopted in practice.

With another type of ball transmissions, in order to avoid the above-mentioned drawbacks, the shafts of the conical surfaces discs were designed as hollow shafts, and within said hollow shafts there were provided axially displaceable control pins contacting the ball from one or both sides for changing the point of attack of the ball between the conical surface discs. The design of a ball transmission of this type, however, is rather complicated and sensitive and requires an extensive construction for actuating the said control pins. Moreover, the control pin in said shafts take away considerable space from the useful surface of the conical area so that the adjusting range is necessarily reduced. This last-mentioned drawback cannot be obviated by increasing the angle of the conical surface discs because this would not result in any material increase in the adjusted range due to the fact that with this design, it would be necessary, with increasing angle of the cone, also to increase the diameter of the control pins in said cone at the expense of the useful surface, in order that it would still be possible to guide the ball by the control pins.

It is, therefore, an object of the present invention to provide an infinitely variable ball transmission which will overcome the above-mentioned drawbacks.

It is another object of this invention to provide an infinitely variable ball transmission which is simple and non-sensitive in structure and permits an easy assembly and disassembly.

It is another object of this invention to provide a transmission as set forth in the preceding paragraph, which will be free from guiding elements embracing the ball so that additional braking and wear by such guiding elements is avoided and the transmission ratio can be held constant.

Still another object of this invention consists in the provision of an infinitely variable ball transmission in which the movement of the ball from one wedging side to the other wedging side will be effected in unimpeded manner when a change in the direction of rotation is effected, so that the transmission will be free from dangerous shocks, which is of particular importance when a change in the direction of rotation occurs frequently and suddenly.

It is also an object of this invention to provide a transmission of the above-mentioned type, which will make it possible to select a very flat angle for the cone of the conical surface discs without restricting the useful surface of the transmission.

These and other objects and advantages of the invention will appear more clearly from the following specification in connection with the accompanying drawings, in which:

FIGURE 1 is a section through a first embodiment of an infinitely variable ball transmission according to the present invention;

FIGURE 2 shows in section an infinitely variable ball transmission similar to that of FIGURE 1 and differing therefrom merely in that the abutment means of the adjusting mechanism consist of a roller in contrast to a pin employed with the arrangement of FIGURE 1;

FIGURE 3 shows a modification over FIGURES 1 and 2 in that the axis of the adjusting mechanism is at an acute angle with regard to the driving shaft;

FIGURE 4 shows a further modified adjusting mechanism according to which the ball abuts a rotatable plate;

FIGURE 5 shows still another modification of an adjusting mechanism which differs from that of FIGURE 4 primarily in that the rotatable plate has been replaced by a plurality of balls in a holding member therefor;

FIGURE 5a illustrates a detail of the holding member of FIGURE 5.

General arrangement

The present invention is based on an infinitely variable ball transmission in which, between two axis parallel conical disc surfaces eccentrically offset with regard to each other, there is arranged a transmission ball and an adjusting device movable transversely to the axis of rotation of the ball for infinitely varying the position of said ball on said conical surfaces, and thereby the transmission ratio. The invention is characterized primarily in that the adjusting device is equipped with an abutment which is adapted to be adjusted uni-laterally perpendicularly or at an inclined angle to the axes of rotation of the conical surfaces, and which limits the changes in the position of the ball on the conical surfaces.

The invention may be realized in various ways. Thus, the adjusting device may be so arranged that its direction of adjusting movement is perpendicular to the shafts to which the conical surfaces are connected which engage the ball, and said direction of movement may be in the common plane in which the axes of said shafts are located. Assuming a single control point, which for this design assures the least friction, the uni-lateral abutment of the adjusting mechanism may consist of a surface which is located at a right angle with regard to the generatrices of said conical surfaces which generatrices pass through the transmission point of the ball. If desired, the adjusting mechanism may instead comprise a rotatable roller or the like the axis of rotation of which is parallel to the shafts of said conical surfaces.

Structural arrangement

Referring now to the drawing in detail and FIG. 1 thereof in particular, the infinitely variable ball transmission shown therein comprises a housing 1 closed by a cover 2. Journalled in said housing and in said cover are respectively discs 4 and 5 with conical surfaces 4a and 5a respectively. The conical surface disc 4 is connected to the input shaft 4b while the conical surface disc 5 is connected to the output shaft 5b. As will be evident from FIG. 1, the conical surface discs 4 and 5 are located opposite to each other so that the conical surfaces 4a and 5a face toward each other while their axes of rotation are eccentrically offset with regard to each other. Between said discs 4 and 5 there is arranged a ball 6 which contacts the conical surfaces 4a and 5a at a point which, in the specific showing of FIG. 1 is located at points 6a and 6b. When input shaft 4b is rotated, ball 6, due to its tendency to center itself in the conical surface 4a, will tend to adjust itself so that its contact point with conical surface 4a will be located at as small a radius of the conical surface 4a as possible. Correspondingly, ball 6 will have the tendency to roll as far as possible to the outer periphery of the conical surface 5a. Ball 6 will follow the just-mentioned tendency until it abuts a uni-lateral abutment 7 of an adjusting mechanism, generally designated 8. In this position, the ball is held and pressed against said abutment 7 by a driving moment which either remains uniform or increases.

The adjusting mechanism 8 substantially comprises a bolt-shaped member the bottom portion of which is formed by an abutment 7 while the top end has a shoulder 8a and a neck 8b. Shoulder 8a engages a nut member N with a threaded bore 8c adjustably engaging a correspondingly threaded portion 1a of housing 1. A spring ring S engages a groove in neck 8b and the adjacent surface portion of nut member N thereby holding the adjusting mechanism 8 to the housing 1. The bolt-shaped member is furthermore provided with a polygonal portion 7a, e.g. a hexagonal section which axially slidably engages a corresponding bore in housing portion 1b. It is to be understood that nut N is rotatable about neck 8b. Therefore, rotation of nut member N in one or the other direction will bring about an axial adjustment of the abutment 7 toward or away from the axes of the conical surface discs 4 and 5.

In order to press the conical surfaces 4a and 5a under a pre-load against ball 6, housing 1 and/or cover 2 may, for instance, be provided with an adjustable hub 3 which may be equipped with a thread or the like, whereby one or both of the conical surface discs 4, 5 may be axially displaced.

By adjusting the abutment 7, the range of movement of ball 6 may be limited in its various possible positions between the conical surfaces 4, 5, which means that the transmission ratio may be varied between the conical surfaces 4a, 5a. Abutment 7 is preferably so dimensioned that it can easily be withdrawn from the transmission together with the adjusting device 8. As will be evident from the above and from FIG. 1, ball 6 in FIG. 1 occupies a position which corresponds substantially to the maximum step-down transmission ratio.

The arrangement of FIG. 2 substantially corresponds to that of FIG. 1, and accordingly, corresponding parts have been designated with the same reference numerals as with FIG. 1. The difference between the arrangement of FIG. 2 and that of FIG. 1 consists primarily in that the abutment 7 of FIG. 1 has been replaced by a roller 9 rotatably journalled on a bolt 10 which is held in the adjusting mechanism 8.

While according to the arrangement of FIGS. 1 and 2 the adjusting direction of the abutment 7, 9 is substantially perpendicular to the longitudinal axes of shafts 4b and 5b, it is also possible to arrange the said abutment members in such a way that their direction of adjustment forms an acute and obtuse angle respectively with the shafts 4b and 5b respectively. Such a design may have a unilateral abutment with one or with more control points. If the abutment has a plane or slightly arched surface, which may also be rotatably journalled in the adjusting device, the abutment will be contacted by the ball at one control point only. It is also possible so to design the abutment that it contacts the transmission ball at three or more control points by means of three or more balls journalled in a corresponding holding member. The three or more balls will support the transmission ball in a friction-free manner against the abutment. The ball-holding member may be adjustably mounted in the adjusting device in such a way that by means of the three balls, it can move its center toward the center of the transmission ball.

An inclined adjusting mechanism as just mentioned is shown by way of example in FIG. 3 in which it has been designated with the reference numeral 11. Adjusting device 11 has a unilateral abutment 12. With this arrangement it is advantageous to make both bearing hubs 3 axially adjustable, for instance by providing the same with a thread 3a meshing with a corresponding thread in housing 1 and cover 2, respectively. Such an arrangement makes it possible to adjust ball 6 with its central portion toward the center of the abutment 12 and at the same time to effect a pre-load at the transmission points between ball 6 and conical surfaces 4a and 5a.

FIG. 4 shows a modified adjusting device 11a according to which the abutment member 12 of FIG. 3 has been replaced by a disc 13 connected to a shaft 13a which is rotatably journalled in the adjusting device 11a by a needle bearing 14 and a thrust ball 14a.

The adjusting device 11b of FIG. 5 differs from that of FIG. 4 in that the disc 13 has been replaced by rotatable balls 15 journalled in a member 16 which in its turn is movably journalled in adjusting device 11b. As will be evident from FIG. 5, the member 16 is freely movable in the adjusting device 11b at a right angle with regard to the adjusting direction so that it can adjust itself by means of balls 15 toward the center of ball 6. Member 16 is prevented from dropping out of device 11b by means of a U-shaped wire 17 shown in FIG. 5a and passed through corresponding bores in adjusting device 11b.

In order to be able, with a corresponding obtuse conical angle of the conical surfaces 4a and 5a, to obtain a control range in excess of 1:4, for instance 1:9, according to the present invention there is employed a ball 6 the diameter of which amounts to more than 60%, preferably 85 to 90% of the maximum diameter of the conical surfaces 4a and 4b.

The transmission according to the present invention may also be employed in a position obtained by turning the arrangement of FIG. 1 about one of the axes of shafts 4b, 5b by 180°. In this position, the abutment 7, 9, 12, 13 or 15 will be located below ball 6. This may bring about the advantage that the ball 6 will already at the starting phase of the transmission abut the abutment so that immediately, the desired transmission ratio is established.

As will be evident from the above, the present invention may be realized in various manners with a minimum of structural elements and can easily be assembled and disassembled. The adjusting device can be withdrawn without disassembling the transmission. Furthermore, the transmission is so designed that identical designs can be employed for the input and output sides.

A further important advantage of the present invention consists in that it is possible to select a very flat angle of the conical surfaces, for instance up to 150° while the useful surface of the conical surfaces will not be reduced or limited by control pins. The said large conical surface angle has the advantage of reducing the friction and the wear with regard to the power being transmitted and thereby assures a high degree of efficiency and a long life.

It will also be evident from the above that the present invention will be particularly advantageous when employed for such friction transmissions which, due to certain circumstances, are exposed to considerable heat. In instances in which the material expansion coefficient of the transmission housing exceeds that of the bearings, conical surfaces and of the ball, the stroke necessary for the wedging of the ball will increase with the increase in heat provided the same torque is assumed. Alternating torque or alternating direction of rotation will under these conditions not harmfully affect the transmission.

It is, of course, to be understood that the present invention is, by no means, limited to the particular constructions shown in the drawings, but also comprises any modifications within the scope of the appended claims.

What I claim is:

1. An infinitely variable ball transmission which includes: housing means, a power input shaft rotatably journalled in said housing means, a power output shaft rotatably journalled in said housing means in axially spaced relationship to said power input shaft, said power output shaft having its axis of rotation substantially parallel to the axis of rotation of said power input shaft, said shafts respectively having those end faces thereof which face toward each other provided with a conical surface, said conical surfaces flaring toward each other, a transmission ball interposed between and in substantially point contact only with said conical surfaces, and adjustable abutment means adjustable selectively toward and away from said shafts for abutment with said ball, said adjustable means being closer to the axis of rotation of said power input shaft than to the axis of rotation of said power output shaft.

2. A transmission according to claim 1, in which said adjustable abutment means includes rotatable roller means for engagement with said transmission ball, and also includes supporting means for said rotatable roller means.

3. A transmission according to claim 1, in which said adjustable abutment means includes an anti-friction bearing for engagement with said transmission ball, and also includes supporting means for said anti-friction bearing.

4. A transmission according to claim 1, in which said abutment means is adjustable along a line substantially perpendicular to both the axis of rotation of said input shaft and the axis of rotation of said output shaft.

5. A transmission according to claim 1, in which said abutment means is adjustable along a line forming an acute angle with the axis of rotation of said input shaft.

6. A transmission according to claim 1, in which said abutment means is adapted to engage said transmission ball at at least one point thereof.

7. A transmission according to claim 1, in which the diameter of said transmission ball is in excess of 60% of the maximum diameter of each of said conical surfaces.

8. A transmission according to claim 1, in which the diameter of said transmission ball is within the range of from 85 to 90% of the maximum diameter of each of said conical surfaces.

9. An infinitely variable ball transmission which includes: housing means, a power input shaft rotatably journalled in said housing means, a power output shaft rotatably journalled in said housing means in axially spaced relationship to said power input shaft, said power output shaft having its axis of rotation substantially parallel to the axis of rotation of said power input shaft, said shafts having those of their end faces which face toward each other respectively provided with conical surfaces flaring toward each other, a transmission ball interposed between said conical surfaces and having point contact only with those conical surface portions respectively pertaining to the input and output shafts which are diametrically oppositely located with regard to said transmission ball, and adjustable abutment means adjustable selectively toward and away from said shafts for abutment with said ball, said adjustable means being closer to the axis of rotation of said power input shaft than to the axis of rotation of said power output shaft and together with the axes of said shafts being located in a common plane.

10. An infinitely variable ball transmission which includes: housing means, a power input shaft rotatably journalled in said housing means, a power output shaft rotatably journalled in said housing means in axially spaced relationship to said power input shaft, said power output shaft having its axis of rotation substantially parallel to the axis of rotation of said power input shaft, said shafts respectively having those end faces thereof which face toward each other provided with a conical surface, said conical surfaces flaring toward each other, a transmission ball interposed between and in substantially point contact only with said conical surfaces, and adjustable abutment means adjustable selectively away from and toward said transmission ball for point contact only with the latter, said adjustable means being closer to the axis of rotation of said power input shaft than to the axis of rotation of said power output shaft.

11. An infinitely variable ball transmission, which includes: housing means, a power input shaft rotatably journalled in said housing means, a power output shaft rotatably journalled in said housing means in axially spaced relationship to said power input shaft, said power output shaft having its axis of rotation substantially parallel to the axis of rotation of said power input shaft, said shafts having those end faces thereof which face toward each other respectively provided with conical end surfaces flaring toward each other, a transmission ball interposed between and in substantially point contact only with said conical surfaces, and adjustable abutment means adjustable selectively toward and away from said transmission ball along a line substantially parallel to those generatrices of said conical surfaces which are in point contact with said transmission ball, said abutment means including a surface portion substantially perpendicular to the line along which said abutment means is adjustable.

12. A transmission according to claim 11, in which said surface portion forms a part of rotatable disc means, said abutment means including anti-friction bearings supporting said rotatable disc means.

13. A transmission according to claim 11, in which said abutment means includes at least three contact balls for contact with said transmission ball and also includes adjustable holding means for said contact balls for adjusting said contact balls along a line passing through the center of said transmission ball.

14. An infinitely variable ball transmission, which includes: housing means, a power input shaft rotatably journalled in said housing means, a power output shaft rotatably journalled in said housing means in axially spaced relationship to said power input shaft, said power output shaft having its axis of rotation substantially parallel to the axis of rotation of said power input shaft, said shafts having those end faces thereof which face toward each other respectively provided with conical surfaces flaring toward each other, at least one of said shafts being adjustable in axial direction thereof to thereby move its conical surface selectively toward and away from the other conical surface, a transmission ball interposed between and in substantially point contact only with said conical surfaces, and adjustable abutment means adjustable selectively toward and away from said shafts for contact with said ball, said adjustable means being closer to the axis of rotation of said power input shaft than to the axis of rotation of said power output shaft.

15. A transmission according to claim 14, which includes anti-friction bearing means for respectively rotatably supporting said input shaft and said output shaft, at least one of said bearing means having its periphery provided with a thread threadedly and adjustably engaging a corresponding thread in said housing means for selectively adjusting the respective bearing means together with the shaft supported thereby.

16. An infinitely variable ball transmission, which includes: housing means having a top and a bottom and two side wall members, at least one of said side wall members being detachably connected to said top and bottom, a power input shaft rotatably journalled in one of said side wall members, a power output shaft rotatably journalled in the other side wall member in axially spaced relationship to said power input shaft, said power output shaft having its axis of rotation substantially parallel to the axis of rotation of said power input shaft, said shafts having those end faces thereof which face toward each other respectively provided with conical surfaces flaring toward each other, a transmission ball interposed between and in substantially point contact only with said conical surfaces, and adjustable abutment means adjustable selectively toward and away from said ball, said adjustable means being closer to the axis of rotation of said power input shaft than to the axis of rotation of said power output shaft.

17. A transmission according to claim 16, in which said adjustable abutment means is mounted in said top, and in which the axis of rotation of the input shaft is closer to the top than to the bottom.

18. A transmission according to claim 16, in which said adjustable abutment means is mounted in the bottom, and in which the axis of rotation of the input shaft is closer to said bottom than to said top.

References Cited by the Examiner

UNITED STATES PATENTS

| 2,272,509 | 2/1942 | Cavallo | 74—198 X |
| 3,026,736 | 3/1962 | Petzhold | 74—193 |

FOREIGN PATENTS 864,021   1/1953   Germany.

DAVID J. WILLIAMOWSKY, *Primary Examiner.*

L. H. GERIN, *Assistant Examiner.*